US005651618A

United States Patent [19]
Tamiya

[11] Patent Number: 5,651,618
[45] Date of Patent: Jul. 29, 1997

[54] PRINTING APPARATUS FOR PRINTING CUTTING MARKS

[75] Inventor: Yoshiyumi Tamiya, Yokohama, Japan

[73] Assignee: Ricoh Company Ltd., Tokyo, Japan

[21] Appl. No.: 446,495

[22] Filed: May 22, 1995

[30] Foreign Application Priority Data

May 25, 1994 [JP] Japan .................................. 6-110779

[51] Int. Cl.$^6$ .................................................. B41J 5/30
[52] U.S. Cl. .............................. 400/70; 400/76; 400/621
[58] Field of Search ........................ 400/621, 625, 400/593, 61, 70, 76, 703, 708, 710, 582; 358/296

[56] References Cited

U.S. PATENT DOCUMENTS

| | | | |
|---|---|---|---|
| 5,026,184 | 6/1991 | Durr et al. | 400/625 |
| 5,223,939 | 6/1993 | Imaizumi et al. | 400/621 |
| 5,232,293 | 8/1993 | Hibon et al. | 400/621 |
| 5,464,289 | 11/1995 | Beaudry | 400/621 |

*Primary Examiner*—John S. Hilten
*Attorney, Agent, or Firm*—Cooper & Dunham LLP

[57] ABSTRACT

A printing unit prints ordinary images on multiple sheets of paper, the printing unit further printing at least one cutting mark on one of the multiple sheets of paper. The at least one cutting mark is printed at a periphery of a relevant one of the ordinary images printed on the one of the multiple sheets of paper. The at least one cutting mark is used as a reference for cutting off peripheries of the multiple sheets of paper. A top sheet detecting unit detects a top sheet of the multiple sheets of paper. An ejecting unit ejects the multiple sheets of paper after the printing unit prints the ordinary images and the at least one cutting mark on the multiple sheets of paper. The ejecting unit thus creates a stack of the multiple sheets of paper. The top sheet is located at the top of the stack of the multiple sheets of paper when the stack of the multiple sheets of paper is in a state in which a relevant one of the ordinary images printed on the top sheet faces upward.

8 Claims, 10 Drawing Sheets

PRINTING APPARATUS FOR PRINTING CUTTING MARKS

BACKGROUND OF THE INVENTION

1. Field of the Invention

The present invention relates to a printing apparatus such as that of a laser printer, a duplicator, a facsimile apparatus or the like. The present invention, in particular, relates to a printing apparatus which prints cutting marks together with an ordinary image.

The cutting marks will now be described. A printing manner may be requested in which an image fills an entire area of the paper sheet so that no blank space is present on the periphery of the paper sheet. Such a request may arise when a magazine, a poster, or the like is to be printed. However, in view of a printing technique of an ordinary printing apparatus such as an ordinary laser printer, it is difficult to print the image on the predetermined size of paper sheet in a manner in which each side of the four sides of the image (having a rectangle outline shape) is coincident with a respective side of the four sides of the predetermined size of paper sheet (having the same rectangle outline shape).

Therefore, in order to achieve the above-mentioned printing manner, a method will now be described with reference to FIG. 1. First, a large-size paper sheet 14, which large size is larger than the above-mentioned predetermined size, is prepared. Then, an image 15 is printed on the large-size paper sheet 14 at the middle thereof and thus a certain blank space is left in a periphery portion 14a of the large-size paper sheet 14 after the printing as shown in the figure. Then, the periphery portion 14a is cut off from the large-size paper sheet 14 having the image 15 printed thereon so that the above-mentioned certain blank space is eliminated and thus the image 15 fills the entire area of a resulting paper sheet 14b. The resulting paper sheet 14b is a paper sheet obtained as a result of the periphery portion being cut off as mentioned above.

For this purpose, a worker manually draws cutting marks 18 on the large-size paper sheet 14 as shown in the figure. The cutting marks 18 are preferably set off from the image 15 by a predetermined distance d (e.g., 3 mm). These cutting marks 18 are used as reference indexes for cutting lines used in the above-mentioned periphery portion cutting off operation.

2. Description of the Related Art

It is possible to provide a printing apparatus which includes a function of printing such cutting marks together with an ordinary image.

Generally speaking, a printing apparatus, for example, includes a paper holding unit comprising a paper cassette or the like for holding multiple sheets of blank paper. Further, a paper carrying mechanism such as a feed roller of the apparatus carries the thus-held multiple sheets of blank paper sheet by sheet. The printing apparatus further includes an image printing mechanism consisting of a laser scanner, a photosensitive drum element, a electrifying charger, a developer, an eraser, a transferring charger, and so forth, in a case of a laser printer, or an ink-jet head, platen roller and so forth, in a case of an ink-jet printer. Such an image printing mechanism prints various images on the multiple sheets of blank paper one by one. In addition, a cutting mark printing mechanism is provided for printing cutting marks on the multiple sheets of blank paper sheet by sheet, either after or before the above-mentioned printing of various images. It is possible to provided a common printing mechanism which is used not only for printing the various images but also for printing the cutting marks.

In the above-described structure of the printing apparatus, the printing mechanism prints the various images together with the cutting marks on the multiple sheets of blank paper which are fed thereto by the paper carrying mechanism sheet by sheet. Thus, the printing apparatus supplies multiple sheets of printed paper, each of which has an image of the various images printed at the middle thereof and cutting marks printed at a periphery portion thereof. Then, a worker may cut out the periphery portions from the multiple sheets of printed paper according to the printed cutting marks. Thus, multiple sheets of paper are obtained, each of which has an image of the various images printed thereon and which image fills the entire area thereof.

There may be a case where such a printing apparatus is connected to a work station and receives an image signal from the work station. The image signal includes data representing cutting marks in addition to ordinary various images and thus the printing apparatus receiving the image signal prints out the data representing the cutting marks and ordinary various images. Thus, the printing apparatus supplies multiple sheets of printed paper, each of which has an image of the ordinary various images together with the cutting marks.

Further, it is also possible that the printing apparatus receives an image signal having data representing ordinary various images and another image signal having data representing cutting marks. The printing apparatus receiving the two image signals prints out the data representing the cutting marks and data representing ordinary various images either through an ordinary image printing mechanism and a separate cutting mark printing mechanism or through a common ordinary image and cutting mark printing mechanism. Thus, the printing apparatus supplies multiple sheets of printed paper, each of which has an image of the ordinary various images together with cutting marks.

Generally speaking, such multiple sheets of printed paper, each of which has an image of the ordinary various images together with cutting marks, will not be cut sheet by sheet but will be cut at the same all together. That is, the multiple sheets of printed paper are stacked up and then a large cutter is used to cut the stacked multiple sheets of paper. Therefore, it is not necessary to print cutting marks on all of the multiple sheets of paper, but it is only necessary to print them on a top sheet of the stacked multiple sheets of paper. Thus, printing cutting marks on all sheets of the multiple sheets of paper fruitlessly increases image processing time and also causes extra printing toner/ink to be consumed.

Further, in a printing technique of an ordinary printing apparatus such as an ordinary laser printer, an accuracy in adjustment of a location of an image being printed with respect to a location of a sheet of blank paper is not so high. Therefore, an error may occur in printing locations of cutting marks between multiple sheets of printed paper.

If no such an error occurs, even if stacked ones of the multiple sheets of printed paper are cut at the same time all together according to cutting marks printed on the top one of the stacked multiple sheets of paper using a large cutter, the printed cutting marks are not substantially left in an inner area of each sheet of printed paper which has been obtained as a result of periphery portions of the stacked multiple sheets of paper being cut off. This is because the large cutter cuts the multiple sheets of paper at positions at which the cutting marks are printed and thus the marks are cut off. If part of the marks is left, the part of the marks is present only just at the edge of the multiple sheets and thus it cannot be recognized ordinarily.

However, if such an error occurs, after the stacked multiple sheets of printed paper have been cut at the same time all together according to the cutting marks printed on the top one of the stacked multiple sheets of paper using the large cutter, the printed cutting marks may be left in an inner area of some sheets of the resulting multiple sheets of printed paper other than the top sheet.

SUMMARY OF THE INVENTION

An object of the present invention is to provide a printing apparatus which can automatically print such cutting marks on multiple sheets of paper. In order to achieve the object, printing means is provided which prints not only ordinary images on multiple sheets of paper, but also prints at least one cutting mark on one of the multiple sheets of paper.

Further, it is also required to provide a printing apparatus which can eliminate the above-mentioned problems. In order to fulfill the requirement, top sheet detecting means is provided for detecting a top sheet of the multiple sheets of paper, and also ejecting means is provided for ejecting the multiple sheets of paper after the printing means prints the ordinary images and the at least one cutting mark on the multiple sheets of paper. The ejecting means thus creates a stack of the multiple sheets of paper. The top sheet is located at the top of the stack of the multiple sheets of paper when the stack of the multiple sheets of paper is in a state in which a relevant one of the ordinary images printed on the top sheet faces upward.

It may be that the top sheet detecting means detects a first sheet of the multiple sheets of paper which is used first in a series of printing operations performed by the printing means. Further, the ejecting means ejects the multiple sheets of paper one by one in a state in which each sheet of the multiple sheets of paper is upside down.

It may be that the top sheet detecting means detects a last sheet of the multiple sheets of paper which is used last in a series of printing operations performed by the printing means. Further, the ejecting means ejects the multiple sheets of paper one by one in a state in which each sheet of the multiple sheets of paper faces upward.

If a number of sheets of the multiple sheets of paper is a very large number, the following provision is preferable: Top sheet detecting means is provided for detecting a top sheet of every predetermined reference number of sheets of the multiple sheets of paper. Further, ejecting means is provided for ejecting the multiple sheets of paper after the printing means prints the ordinary images and at least one cutting mark on the multiple sheets of paper. the ejecting means thus creates a stack of the multiple sheets of paper. The top sheet is located at the top of a stack of every predetermined reference number of sheets in the stack of the multiple sheets of paper when the stack of the multiple sheets of paper is in a state in which a relevant one of the ordinary images printed on the top sheet faces upward. The above-mentioned predetermined reference number of sheets is a number of sheets for which a certain cutter can cut off the peripheries thereof all at once.

If it is desired to print the cutting marks in a desired color, the following provision is preferable: The printing means comprises a plurality of single-color printing means, and at least one of the plurality of single-color printing means is selected for printing the at least one cutting mark.

It may be that printing means prints ordinary images and cutting marks on multiple sheets of paper and preventing means is provided for selectively preventing the printing means from printing the cutting marks on all of the multiple sheets of paper.

If image signals are received from outside, the following provision is preferable: First receiving means receives a first image signal carrying image information of ordinary images. Second receiving means receives a second image signal carrying image information of at least one cutting mark. First printing means prints the ordinary images on multiple sheets of paper using the first signal. Second printing means prints the at least one cutting mark on one of said multiple sheets of paper using the second image signal. Preventing means prevents at least one of the second receiving means and the second printing means from performing a relevant operation when predetermined ones of the multiple sheets of paper are used in a series of printing operations. Thus, printing of the at least one cutting mark on these predetermined ones of the multiple sheets of paper are used in a series of printing operations is prevented.

Other objects and further features of the present invention will become more apparent from the following detailed description when read in conjunction with the accompanying drawings.

DESCRIPTION OF PREFERRED EMBODIMENTS

Figure 2:
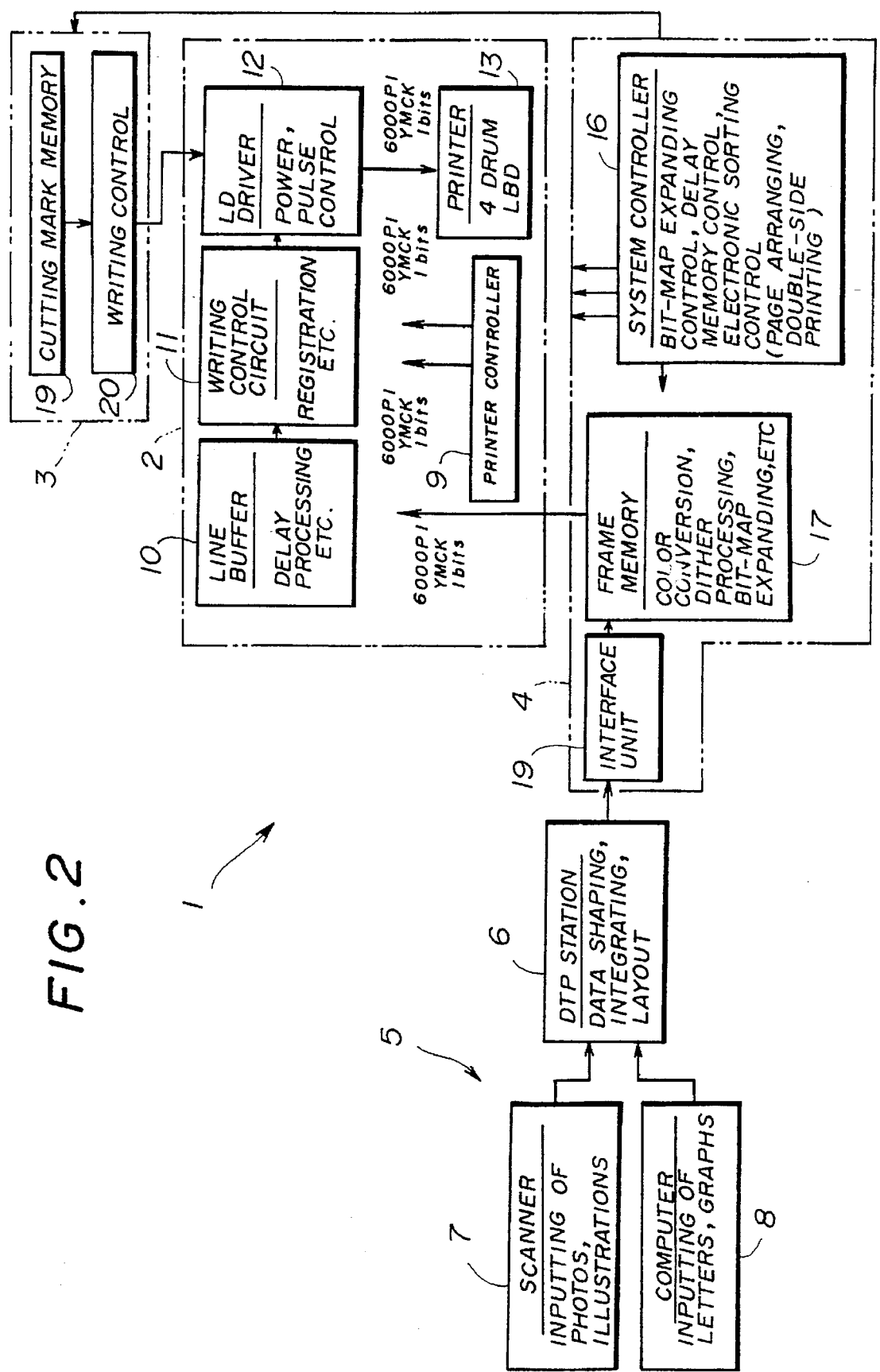
FIG. 2 shows a block diagram of each of printer systems in a first embodiment and a second embodiment of the present invention.

A printer system 1 in a first embodiment of the present invention will now be described with reference to FIG. 2. This printer system 1 includes a laser printer 2, a control unit 3 and a raster image processor (which will be referred to as RIP, hereinafter) unit 4. A desk top publishing (which will be referred to as DTP, hereinafter) system 5 connected to the RIP unit 4 includes a DTP station 6, a scanner 7 and a computer 8.

The laser printer 2 includes a printer controller 9 for executing various control operations, a line buffer 10 for executing a delay processing and so forth, a writing control circuit 11 for executing a printing location registration operation and so forth, an LD driver 12 for control outputs or pulses of a laser diode (which will be referred to as LD, hereinafter), a printer mechanism 13 for executing a printing operation and so forth.

The printer mechanism 13 includes a paper holding unit comprising a paper cassette or the like for holding multiple sheets of blank paper 14. The printer mechanism 13 further includes a paper carrying mechanism such as a feed roller of the apparatus which carries the thus-held multiple sheets of blank paper 14 sheet by sheet. The printer mechanism 13 further includes an image printing mechanism for printing various ordinary images 15 on the thus-carried multiple sheets of blank paper 14 sheet by sheet. The image printing mechanism includes four single-color printing mechanisms which use four different colors yellow, magenta, cyan and black (which will be referred to as Y, M, C and K, hereinafter), and thus prints the various ordinary images 15 on the multiple sheets of blank paper 14.

The above-mentioned RIP unit 4 includes a system controller 16 for executing a bit-map expanding control operation, a delay-memory control operation, an electronic sorting control operation and so forth, and a frame memory 17 used for executing color conversion, dither processing, the bit-map expanding and so forth. The above-mentioned control unit 3 includes a cutting mark memory 19 for storing printing signal cutting marks 18 such as those shown in FIG. 1, and a writing control circuit 20 for controlling an operation for printing the cutting marks 18 and so forth.

In this printer system 1, signal receiving means is provided in the RIP unit 4 using an interface unit 19 shown in the figure or the like. The signal receiving means receives an image signal including data representing the cutting marks 18. In accordance with the image signal which the signal receiving means has received, the printer mechanism 13 of the laser printer 2 executes an image printing operation. In the laser printer 2, the multiple sheets of blank paper 14 are carried to the above-mentioned image printing mechanism through the above-mentioned paper carrying mechanism and the various ordinary images 15 are printed thereon. Thus, multiple sheets of printed paper are supplied by the laser printer 2 sheet by sheet in a manner in which each sheet, from the first page to the last page, is ejected in a state in which the back side thereof faces upward.

In this laser printer 2, first page detecting means is provided in the printer controller 9 or the like, which means detects whether or not a sheet of paper of the multiple sheets of paper 14 being currently carried to the above-mentioned image printing mechanism is the first page of the multiple sheets of paper. If the first page detecting means detects that the currently carried sheet of paper 14 is the first page, cutting mark printing means, which is provided in the image printing mechanism or the like of the printer mechanism 13, prints the cutting marks 18 on the relevant sheet of paper 14.

According to the image signal received through the signal receiving means of the RIP unit 4, the printer mechanism 13 of the laser printer 2 in this printer system 1 forms an electrostatic latent image including the ordinary image 15 and cutting marks 18 on a photosensitive drum element. Further, mark erasing means comprising, for example, the above-mentioned eraser or the like is provided for selectively erasing the cutting marks 18 once formed as part of the electrostatic latent image on the photosensitive drum element as mentioned above. The cutting marks 18 erased by the mark erasing means are those which would have been printed on the multiple sheets of blank paper 14, except the first sheet thereof. In other words, the mark erasing means does not erase the cutting marks to be printed on the first sheet or top sheet of the multiple sheets of blank paper.

The above-mentioned eraser will now be described. In the description, it is assumed that a positive-positive system is used in an electrophotographic printing system. The positive-positive system is a system in which, after uniformly charging the photosensitive drum element, a region on the photosensitive drum element which is not exposed to light emitted by laser diodes operating at their full capacities, will result in a region in an image printed on a paper sheet which is black.

Figure 1:
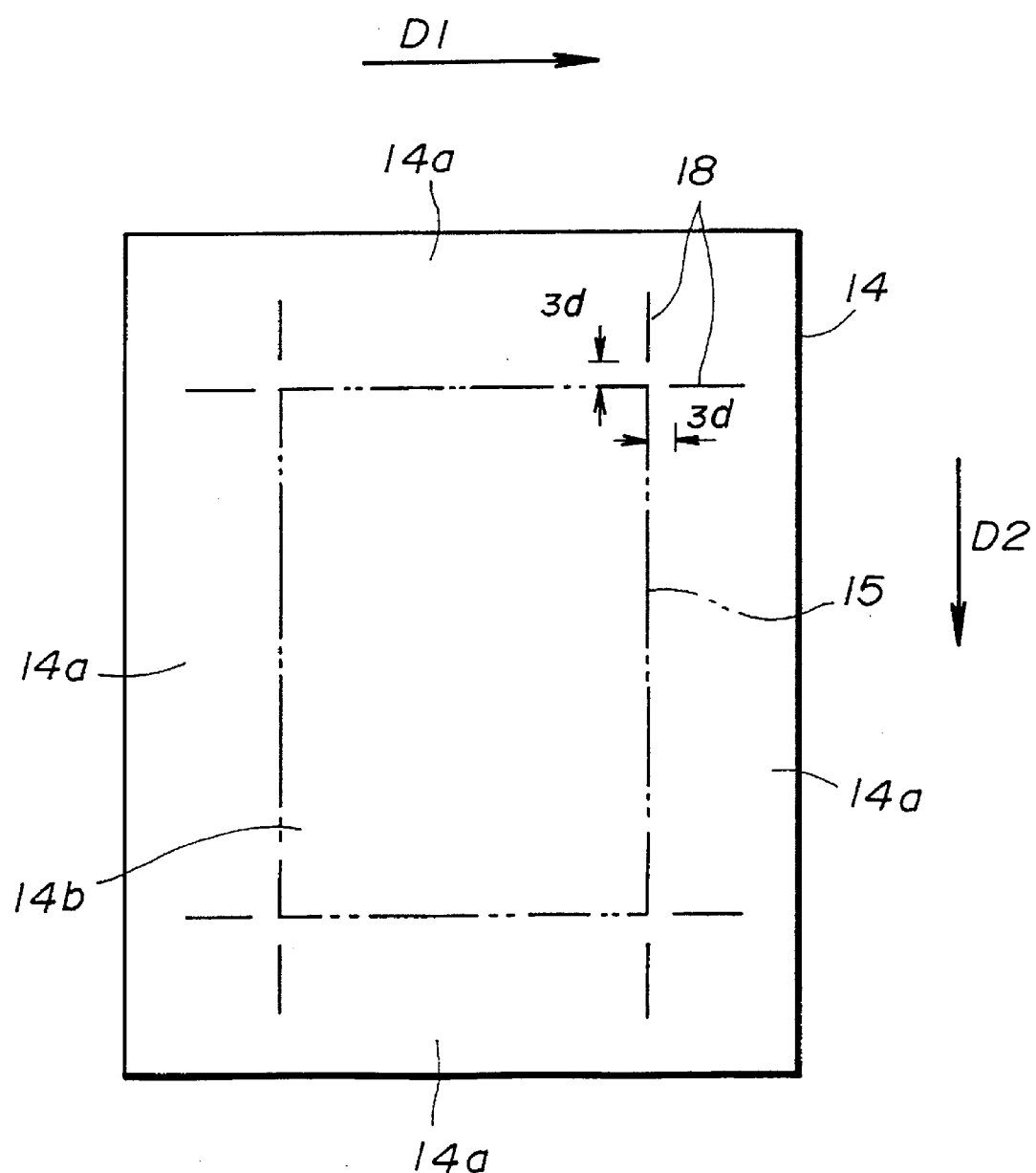
FIG. 1 shows a plan view of a sheet of multiple sheets of paper, showing a relationship between an area for printing an ordinary image and positions for printing cutting marks.

The eraser includes two separate erasing laser diode units which are provided for two ends, along a main scan direction D1 shown in FIG. 1, of a paper sheet, respectively, in addition to an image forming laser diode unit. An electrostatic-latent-image forming mechanism in the electrophotographic printing system is formed so that, first, the image forming laser diode unit forms an electrostatic latent image according to an image signal carrying image information representing an ordinary image 15 and images of the cutting marks 18 on the photosensitive drum element. This image forming is performed as a result of light emitted by the image forming laser diode unit sweeping a region on the photosensitive drum element, which region corresponds to a region, in on a paper sheet 14, extending along a sub-scan direction D2 with a width Wo shown in FIG. 3.

Figure 3:
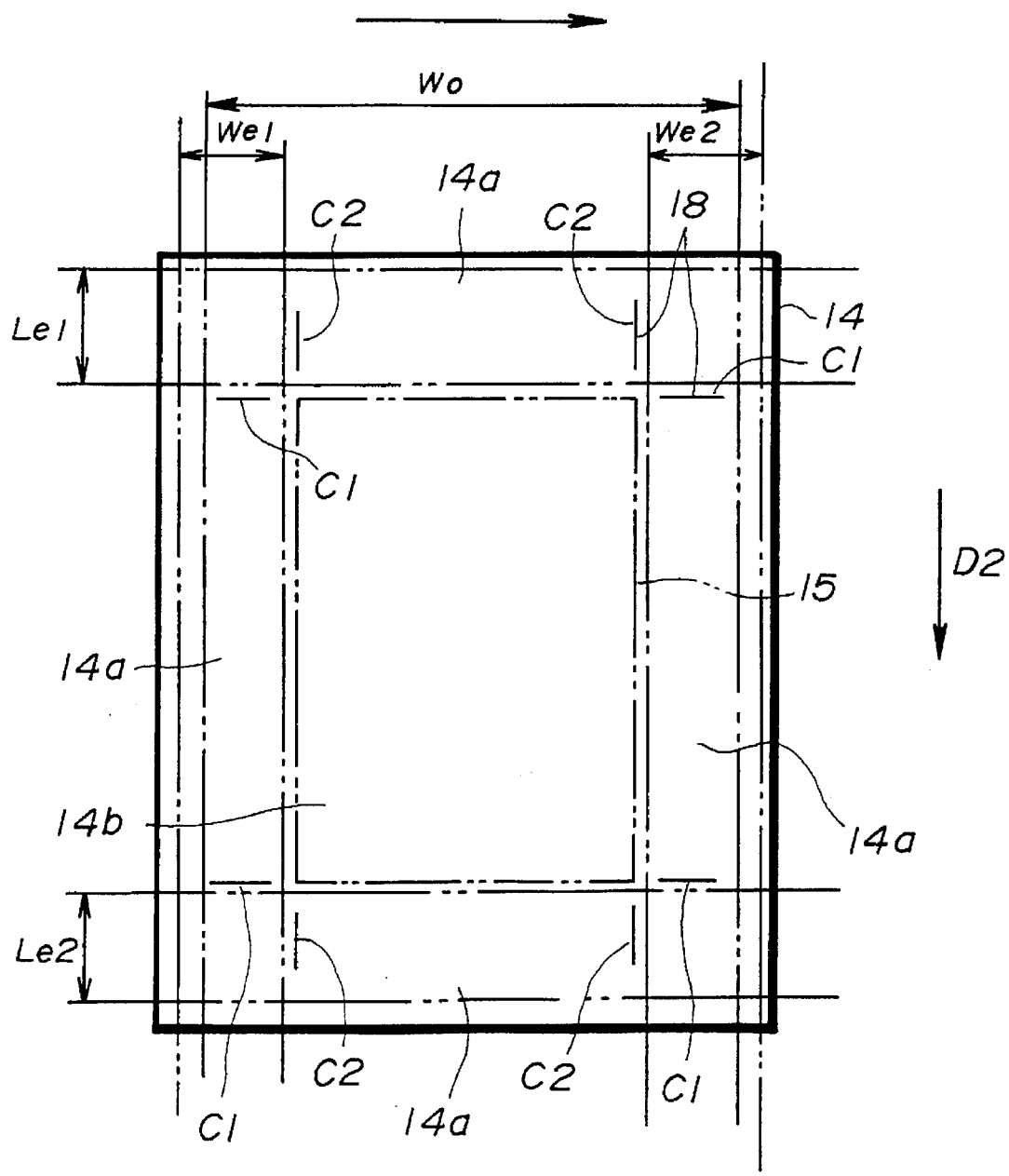
FIG. 3 shows a plan view of a sheet of multiple sheets of paper, showing regions on which erasing operations are performed.

Then, when cutting marks C1, of the cutting marks 18, extending along the main scan direction D1 are erased, the erasing laser diode units, being fully activated such that light is emitted at its full capacity, sweep regions on the photosensitive drum element, which regions correspond to regions, of a paper sheet 14, extending along the sub-scan direction D2 with widths We1 and We2 shown in FIG. 3.

As a result, all the regions swept by the light of the erasing laser diode units are exposed by the light, which regions include images of the cutting marks C1 extending along the main scan direction D1 once formed on the photosensitive drum element, and thus the images are erased. Thus, the cutting marks C1 extending along the main scan direction are not printed on the paper sheet 14.

The eraser further includes means for erasing cutting marks C2 extending along the sub-scan direction D2 of the paper sheet 14. The cutting marks C2 extending along the sub-scan direction D2 cannot be erased by the erasing laser diode units because these cutting marks C2 are not included in the above-mentioned regions extending along the sub-scan direction D2 with the widths of We1 and We2 as shown in FIG. 3. The means for erasing cutting marks C2 extending along the sub-scan direction D2 of the paper sheet 14 is an operation of the image forming laser diode unit. This operation is an operation for causing the image forming laser diode unit to emit light at its full capacity for time periods when light emitted by the image forming laser diode unit sweeps regions extending along the main scan direction D1 with widths of Le1 and Le2 shown in FIG. 3. These regions include positions at which electrostatic latent images of the cutting marks C2 are formed on the photosensitive drum element, and thus the images are erased. Thus, the cutting marks C2 extending along the sub-scan direction D2 are not printed on the paper sheet 14.

The above-mentioned method of using the eraser is preferable. However, other methods for erasing the cutting marks 18 by controlling image data, which will now be described, may be used. In these method, an image signal supplied to the printer does not carry image data representing the cutting marks 18.

A first method thereof is a method in which two image memories are provided, a first image memory having image data representing the cutting marks previously stored therein and a second image memory not having the image data of the cutting marks. If a page of image data which will be printed out together with the cutting marks is printed, the first image memory is used. As a result, the image forming laser diode unit is driven by the image data stored in the first memory together with the image data of the cutting marks and thus the image together with the cutting marks is printed. If a page of image data which will be printed out without the cutting marks is printed, the second image memory is used. As a result, the image forming laser diode unit is driven by the image data stored in the second memory without the image data of the cutting marks and thus the image together without the cutting marks is printed.

A second method of the methods for erasing the cutting marks 18 by controlling image data will now be described. In the second method, only one image memory is used. If a page of image data which will be printed out together with the cutting marks is printed, the image data representing the cutting marks, which is previously stored in another memory, is transferred to the image memory and thus the page of image data includes the image data of the cutting marks. As a result, the image forming laser diode unit is driven by the image data stored in the memory together with the image data of the cutting marks and thus the image together with the cutting marks is printed. If a page of image data which will be printed out without the cutting marks is printed, the transferring of the image data representing the cutting marks to the image memory is not performed, and thus the page of image data does not include the image data of the cutting marks. As a result, the image forming laser diode unit is driven by the image data stored in the memory without the image data of the cutting marks and thus the image without the cutting marks is printed.

If the above-mentioned first method of the above two mark erasing methods controlling the image data is used, as a result of using the double image memories, costs of the printing system are increased. If the second method is used, it is necessary to transfer the image data of the cutting marks to the image memory when the cutting marks are printed. Thus, a time required for the printing operation is increased.

By using such an eraser or a mark erasing method, during the above-mentioned laser printer 2 printing the images 15 successively on the multiple sheets of blank paper 14 in accordance with the image signal received by the RIP unit 4 from the DTP station 6, the mark erasing means selectively either erases electrostatic latent images of the cutting marks 18 formed on the photosensitive drum element or omits adding the image data of the cutting marks 18. Thus, it is possible to obtain multiple sheets of printed paper in which only the top sheet has the cutting marks 18 printed thereon.

This image printing mechanism includes the four single-color printing mechanisms as mentioned above. Single color selecting means for a user to select at least one of the four single-color printing mechanisms as means for printing the cutting marks 18 is provided. Each of the four single-color printing mechanisms has a respective eraser such as the eraser described above. The single-color selecting means may be provided in a form of a setting switch (not shown in the figures) or the like provided on the above-mentioned printer controller 9 or an operating panel of the laser printer 2.

Further, means for counting a number of sheets is provided in the printer controller 9 of the laser printer 2 in the printer system 1 as a form of a sheet counter (not shown in the figures) or the like. The means for counting a number of sheets counts a number of the multiple sheets of paper 14 which are successively carried by the above-mentioned paper carrying mechanism and then used for successively printing the images 15.

In the above-mentioned arrangement of the printer system 1, the laser printer 2 prints the images 15 using multiple colors on the multiple sheets of paper 14 in accordance with the image signal sent by the DTP system 5. At this time, the laser printer 2 prints the images 15 on the multiple sheets of paper 14 respectively with multiple colors, wherein the cutting marks 18 are printed only on the top sheet of the multiple sheets of paper 14.

Figure 4:
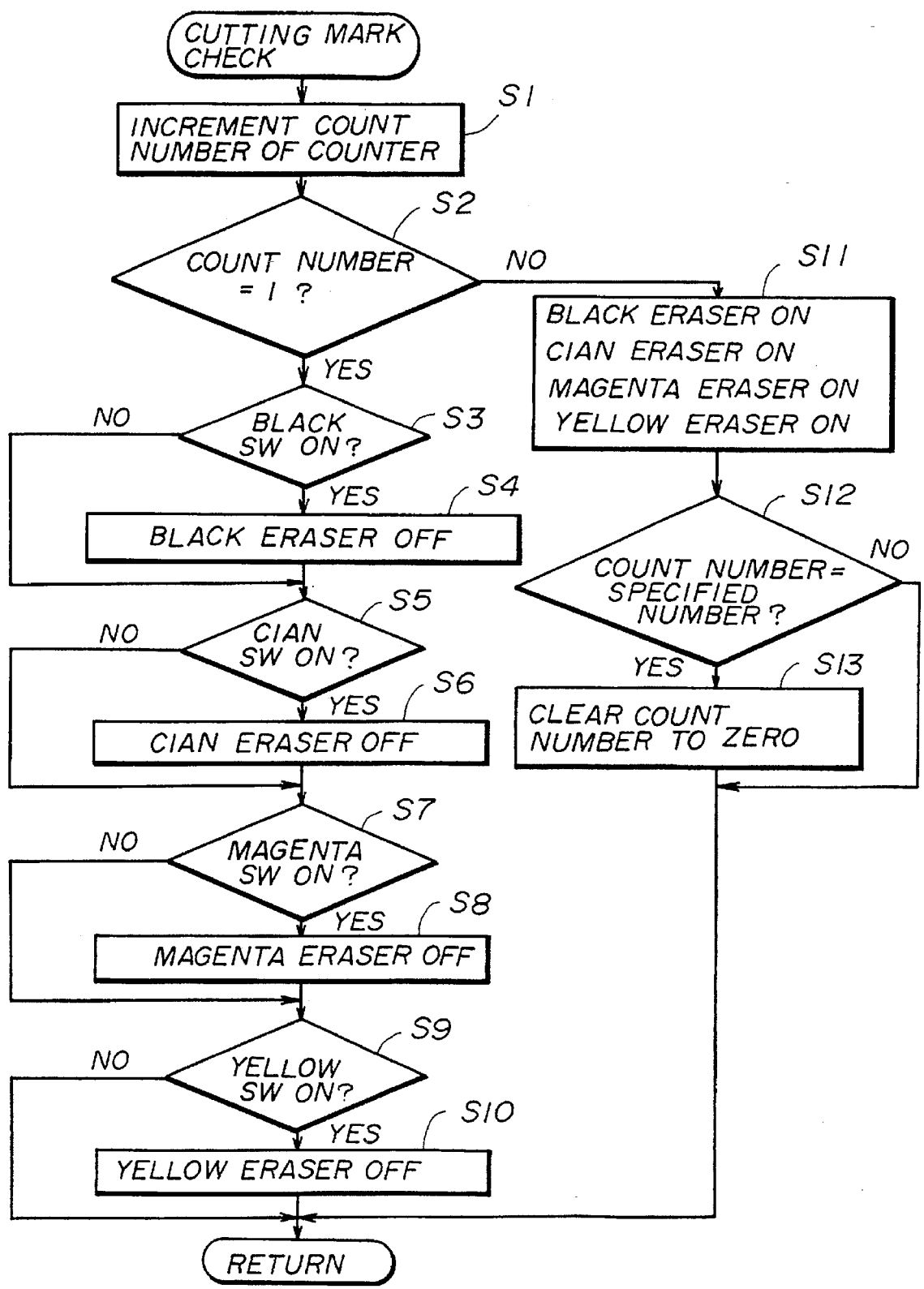
FIG. 4 shows an operation flowchart of appropriately preventing printing of cutting marks in the printer system in the first embodiment of the present invention.

Specifically, as shown in FIG. 4 as an example, after the laser printer 2 starts a printing operation, a count number of the above-mentioned sheet counter, initially having a count number "0" preset therein, is incremented by one every sheet of the printing operation in a step S1 (a term "step" will be omitted, hereinafter). In S2, it is determined whether or not the current count number of the sheet counter is equal to "1". Then, if a result of S2 is YES, this means that the current processing page of image information is the first page thereof and thus the first page is printed on the top sheet of the multiple sheets of paper 14. Then, through subsequent S3, S4, S5, S6, S7, S8, S9 and S10, it is determined which of the above-mentioned four single-color printing mechanisms was previously selected as the cutting-mark printing means by a user through the above-mentioned setting switch. Then, the above-described cutting-mark erasing function of the eraser of the preselected at least one single-color printing mechanism is selectively inactivated. As a result, after each one of the four single-color printing mechanism forms electrostatic latent images including the images of the cutting marks 18 on the photosensitive drum element with a respective color, the respective eraser erases the cutting mark images for the electrostatic latent images formed by the three single-color printing mechanism other than the above-mentioned preselected at least one single-color printing mechanism. The electrostatic latent images of the cutting marks 18 formed by the preselected at least one single-color printing mechanism remains on the photosensitive drum element. Then, the thus-remaining images of the cutting marks 18 are developed together with the ordinary image 15 and thus are transferred to the top sheet of the multiple sheets of paper 14. Thus, the ordinary image 15 and the cutting images 18 are printed on the top sheet of the multiple sheets of paper 14.

Then, subsequent pages of the image information are printed out on subsequent sheets 14 of the multiple sheets of paper by the printer system 1 after completing printing of the first page of image information on the top sheet of the multiple sheets of paper 14. At this time, S1 increments the count number of the sheet counter and thus S2 determines that the current count number is not equal to "1". Thus, S11 activates the erasers of all the single-color printing mechanisms. Therefore, all electrostatic latent images of the cutting marks 18 once formed on the photosensitive drum element are erased by the erasers. Only the ordinary images 15 are printed on the subsequent sheets 14 of the multiple sheets of paper with multiple colors.

In S12, it is determined whether or not the current count number of the sheet counter has reached a specified number. This specified number is previously input to the printer system 1 as a number of sheets of the above-mentioned multiple sheets of paper 14. If a result of S12 is YES, this means that the image information has been used to print relevant images on all of the multiple sheets of paper 14, and thus the count number of the sheet counter is initialized to be "0" in S13. Thus, the operation for printing the image information on the multiple sheets of paper 14 has been completed.

Four sides of each sheet of the thus-obtained multiple sheets of printed paper 14 now stacked are cut out, all at once, with a large cutter in accordance with the cutting marks 18 printed only on the top sheet thereof after being stacked neatly.

In the above-described printing operation, because the cutting marks 18 are not actually printed on the multiple sheets of paper 14 except the top sheet thereof, it may be possible to reduce time required for actual printing works with toner/ink. Further, it is possible to reduce a consumption rate of printing toner or ink.

Further, because no cutting marks 18 are actually printed on the multiple sheets of paper 14 except the top sheet thereof, there is not possibility of leaving any parts of the cutting marks 18 at peripheries of the above-mentioned resulting paper sheets 14b except the top sheet thereof.

In this printer system 1, a user can select, through the above-mentioned setting switch, at least one color of the four single colors Y, M, C and K, with which the cutting marks 18 are printed. Therefore, there may be a case where the cutting off of four sides of each sheet of the multiple sheets of paper 14 is performed in a manner in which the thus-printed cutting marks 18 remain after the cutting off process. For such a case, an inconspicuous color such as yellow may be used as the at least one color to be selected as the color of the cutting marks 18. There may be another case in which it is desired to call strong attention of a worker to the cutting work. For such a case, a conspicuous color such as magenta may be used as the at least one color to be selected as the color of the cutting marks 18.

Further, it is also possible to print the cutting marks 18 in the four single different colors on the first, second, third and fourth sheets of the multiple sheets of blank paper 14, respectively. Thereby, it is possible to check a printing positioning error for each single-color printing mechanism.

In the first embodiment of the present invention, as shown in FIG. 4, the cutting marks 18 which are normally printed on all sheets of the multiple sheets of paper 14 are selectively substantially erased or prevented from being actually printed. However, as a function of a printer system in a second embodiment of the present invention, it is possible that the cutting marks 18 which are normally printed on none of the multiple sheets of paper 14 are selectively printed on only the top one of the multiple sheets of paper 14. This function is shown in FIG. 5.

Figure 5:
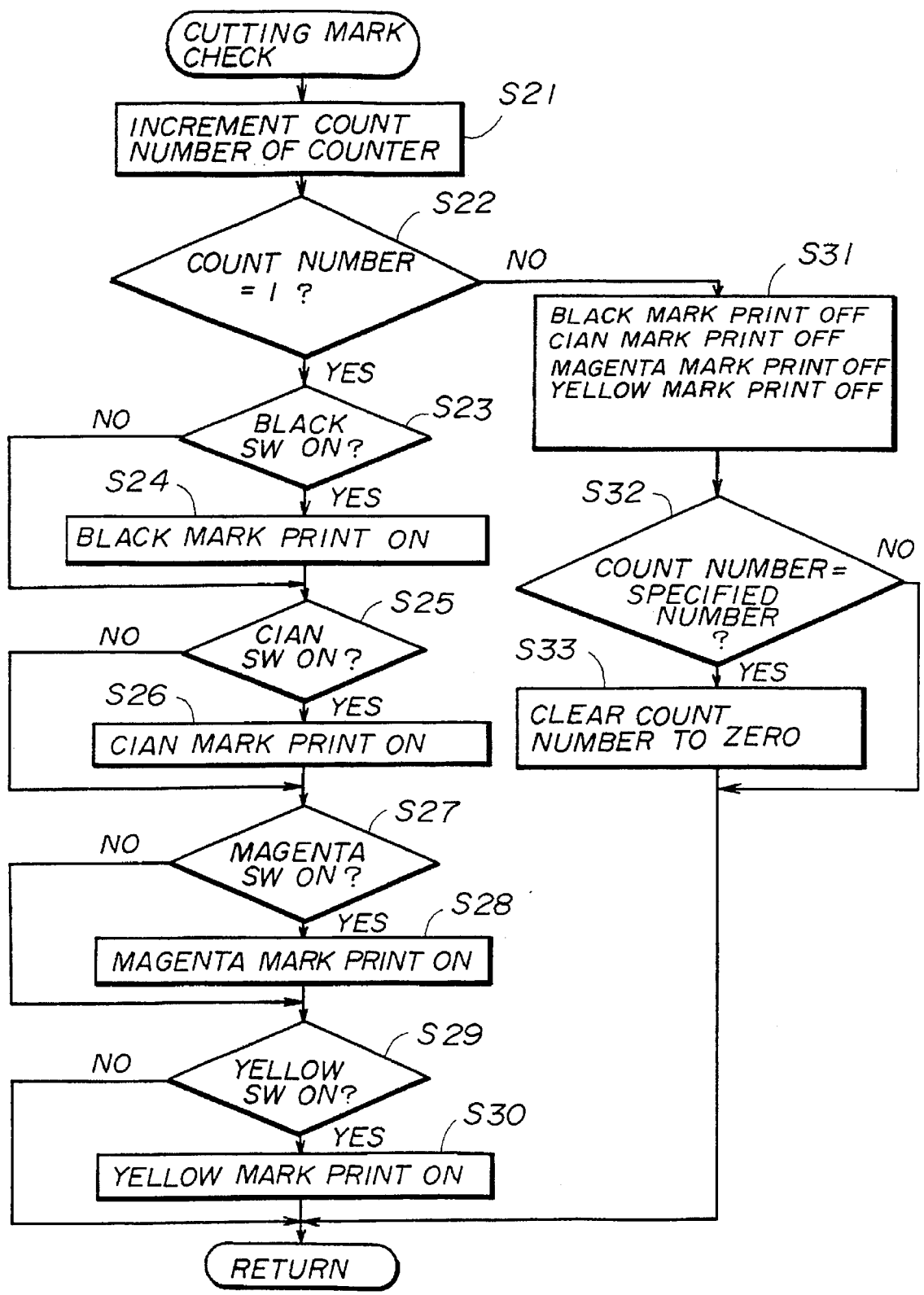
FIG. 5 shows an operation flowchart of appropriately preventing printing of cutting marks in the printer system in the second embodiment of the present invention.

In an operation flowchart shown in FIG. 5, printing of the cutting marks 18 is performed in S24, S26, S28 and S30 instead of erasing of the cutting marks 18 being prevented. Further, printing of the cutting marks 18 is prevented in S31 instead of the erasing of the cutting marks 18 being performed. Except for these matters, the operation sequence shown in FIG. 5 is the same as the operation sequence shown in FIG. 4. In fact, S21, S22, S23, S25, S27, S29, S32 and S33 are the same as S1, S2, S3, S5, S7, S9, S12 and S13 shown in FIG. 4, respectively. Except for the above-mentioned difference in the operations, the printer system in the second embodiment may have a structure the same as that of the printer system 1 in the above-described first embodiment of the present invention.

Further, it is also possible that the printer system 1 in the first embodiment in the present invention further has the particular functions of the printer system in the second embodiment in the present invention. In this case, the operator may select one of operation modes, the printer system 1 performing the particular functions of the first embodiment in one operation mode and the printer system 1 performing the particular functions of the second embodiment in the other operation mode Further, the printer system 1 in the first embodiment of the present invention, receives an image signal carrying image information including image information of the cutting marks 18, which signal is sent by the DTP system 5.

Figure 6:
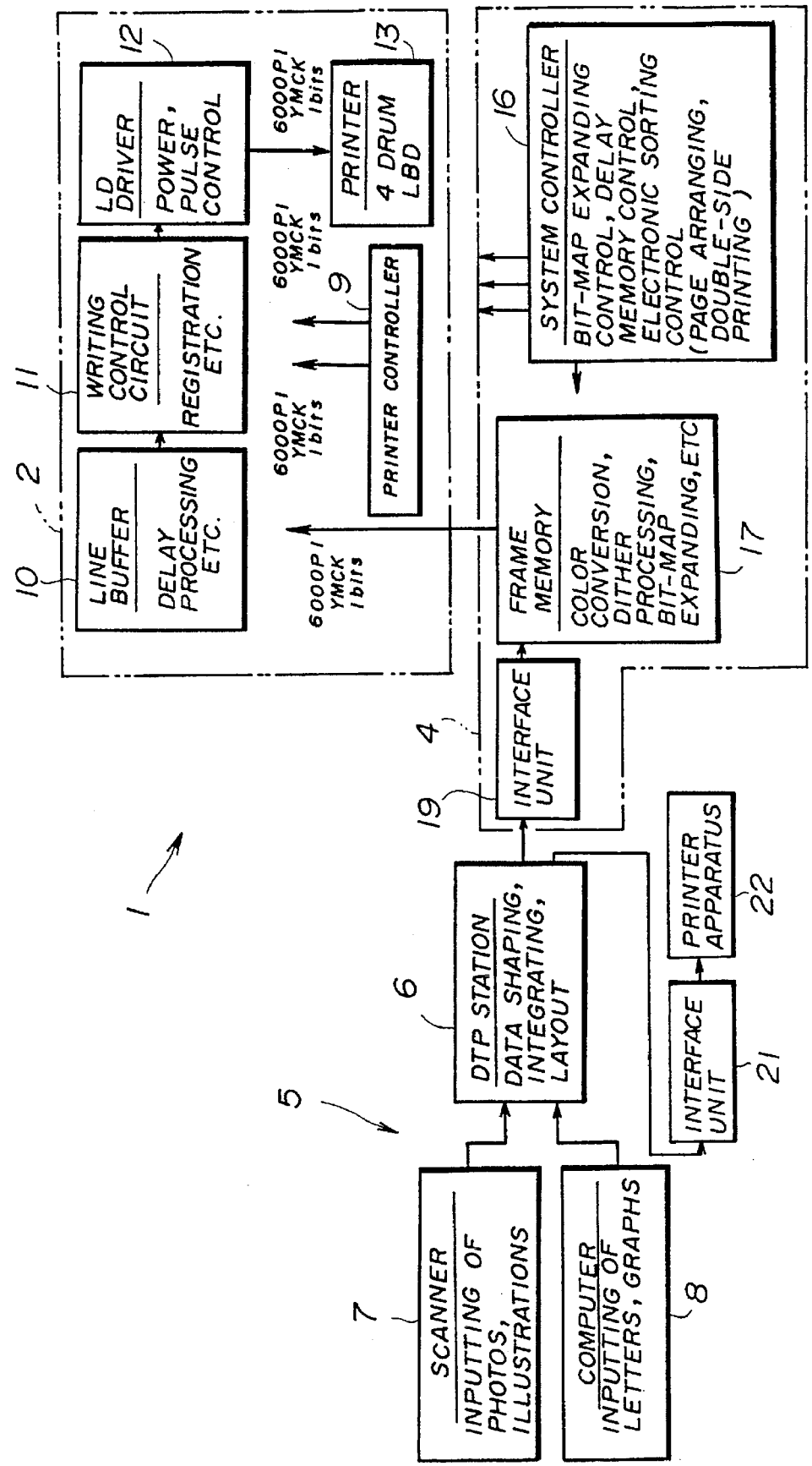
FIG. 6 shows a block diagram of a printer system in a third embodiment of the present invention.

However, as a third embodiment of the present invention, it is also possible to be separately provided with first image receiving means for receiving an image signal particularly carrying image information of ordinary images 15 and second image receiving means for receiving an image signal particularly carrying image information of the cutting marks 18. Further, this third embodiment is also provided with a separate printing means particularly for printing the cutting marks 18, using the image signal particularly carrying image information of the cutting marks 18 received through the second receiving means, on the multiple sheets of paper 14, separately from the printing of the ordinary images 15 on the same multiple sheets of paper 14 performed through the RIP unit 4, and laser printer unit 2. This third embodiment is shown in FIG. 6. The interface unit 19 acts as the above-mentioned first receiving means, an interface unit 21 acts as the second receiving means and a printer apparatus 22 acts as the separate printing means. This printer apparatus 22 may include units similar to those included in the RIP unit 4, laser printer unit 2 and control unit 3 so as to appropriately print the cutting marks 18. Except for these matters, the printer system in the third embodiment may have a structure the same as that of the printer system 1 in the above-described first embodiment of the present invention.

In this third embodiment, control means such as the printer controller 9 controls the interface unit 21 and printer apparatus 22. Thus, either the signal receiving operation of the interface unit 21 is selectively prevented or the printing operation of the printer apparatus 22 is selectively prevented except when the top sheet of the multiple sheets of paper 14 is used for the image printing operation in the printer system.

In the printer system 1 in the first embodiment of the present invention, the laser printer 2 ejects the multiple sheets of printer paper 14 from the first sheet representing the first page of a document to the last page of the document in a manner in which each sheet is upside down. Then, the thus-obtained stack of the multiple sheets of printed paper 14 is turned upside down. As a result, the obtained stack of the multiple sheets of printed paper 14 is in a state in which the first page of the document is exposed upwardly on the top sheet. Therefore, when this laser printer 2 prints the cutting marks 18 only on the top sheet, the cutting marks 18 can be seen from the top and thus the periphery of the stack of the multiple sheets of printed paper 14 can be cut off in accordance with the thus-seen cutting marks 18.

However, by switching an operation mode, this laser printer 2 can also operate in a manner in which the laser printer 2 ejects the multiple sheets of printer paper 14 from the last page of the document to the first page of the document in a manner in which each sheet faces upward. Then, without being turning upside down, the thus-obtained stack of the multiple sheets of printed paper 14 is in a state in which the first page of the document is exposed upwardly on the top sheet. The above-mentioned switching an operation mode may be achieved as a result of, for example, changing a paper ejecting path or the like in the laser printer 2.

In this case, the printing is performed from the last page of the document to the first page of the document and thus the multiple sheets of printed paper 14 are ejected from the first sheet representing the last page of the document to the last sheet representing the first page of the document. Therefore, if the laser printer 2 is controlled as described above and thus the cutting marks 18 are printed on only the first sheet of the multiple sheets of paper 14, this sheet is placed at the bottom in the resulting stack of the multiple sheets of printed paper 14. That is, no cutting marks 18 are printed on the sheet placed at the top in the resulting stack of the multiple sheets of printed paper 14. Therefore, in this case, it is necessary to print the cutting marks 18 only on the last sheet of the multiple sheets of paper 14, which last sheet is last used in the series of printing operations and thus is placed at the top in the resulting stack of the multiple sheets of printed paper 14.

Figure 7:
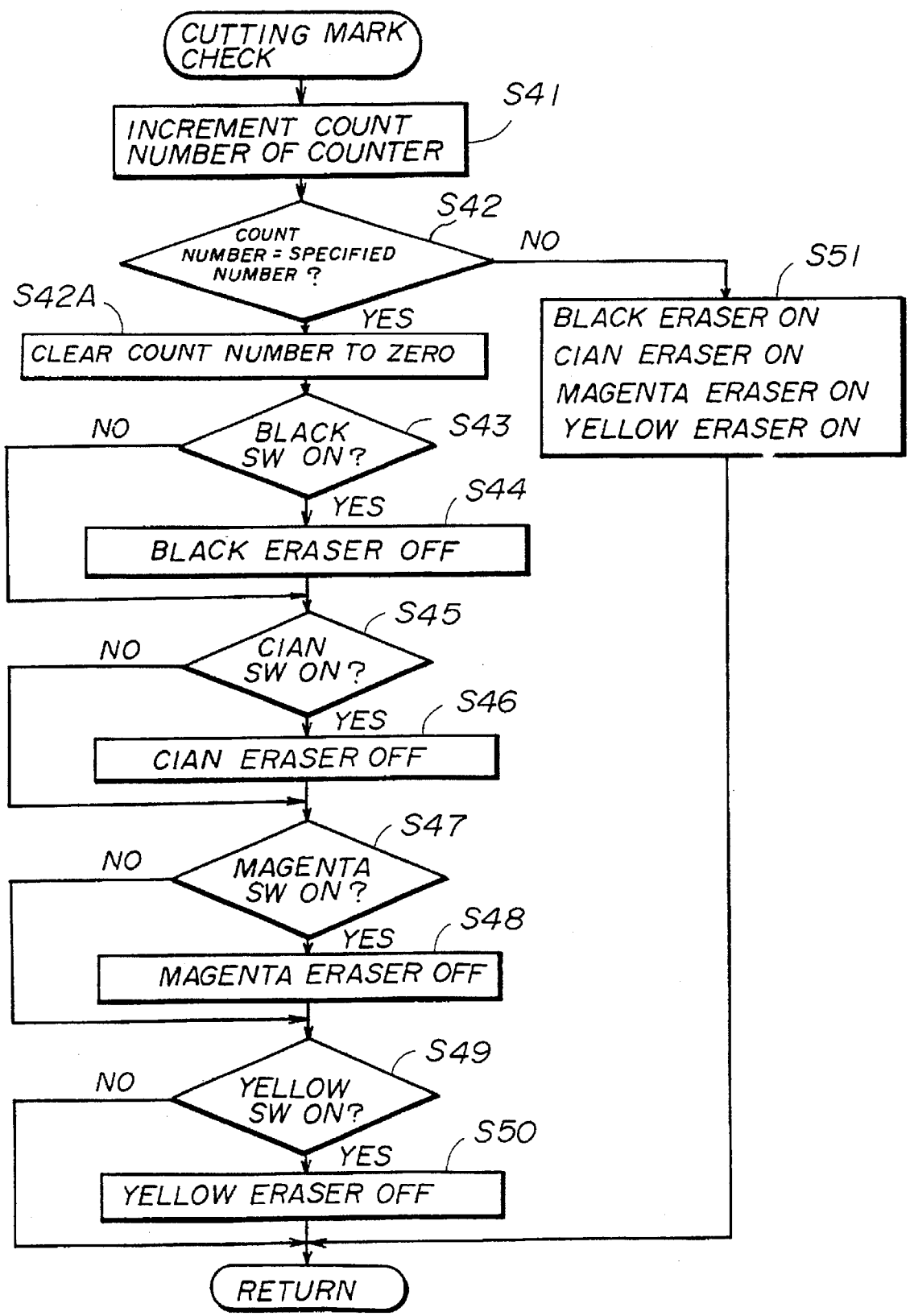
FIG. 7 shows another operation flowchart of appropriately preventing printing of cutting marks in the printer system in the first embodiment of the present invention.

For this purpose, the printer system 1 in the first embodiment of the present invention can operate as shown in an operation flowchart shown in FIG. 7. Instead of the operation flowchart shown in FIG. 4, the printer system 1 operates in an operation mode resulting from switching from an operation mode in which the printer system 1 operates in accordance with the operation flowchart shown in FIG. 4. In the operation in the thus-resulting operation mode, the printer system 1 detects the last sheet of the multiple sheets of printed paper 14. Then, the laser printer 2 prints the cutting marks 18 only on the last sheet.

The printer system 1 previously receives from the DTP system 5 information indicating a number of sheets of the multiple sheets of paper 14. The above-mentioned sheet counter counts how many sheets of paper have been used in the printing operation as mentioned above. Then, if the count number of the sheet counter is in coincidence with the previously informed (specified) number of sheets of the multiple sheets of paper 14 (in S42 in FIG. 7), it can be determined that the currently used sheet is the last sheet of the multiple sheets of paper 14. Then the counter number of the sheet counter is cleared to 0 in S42A and cutting marks in an appropriate color are printed through S43, S44, S45, S46, S47, S48, S49 and S50.

If the count number of the sheet counter is not in coincidence with the previously informed (specified) number of sheets of the multiple sheets of paper 14 (in S42 in FIG. 7), it can be determined that the currently used sheet is not the last sheet of the multiple sheets of paper 14. Then, the erasers are activated in S51 and thus no cutting marks are printed.

S41, S43, S44, S45, S46, S47, S48, S49, S50 and S51 are the same as S1, S3, S4, S5, S6, S7, S8, S9, S10 and S11 shown in FIG. 4, respectively.

Figure 8:
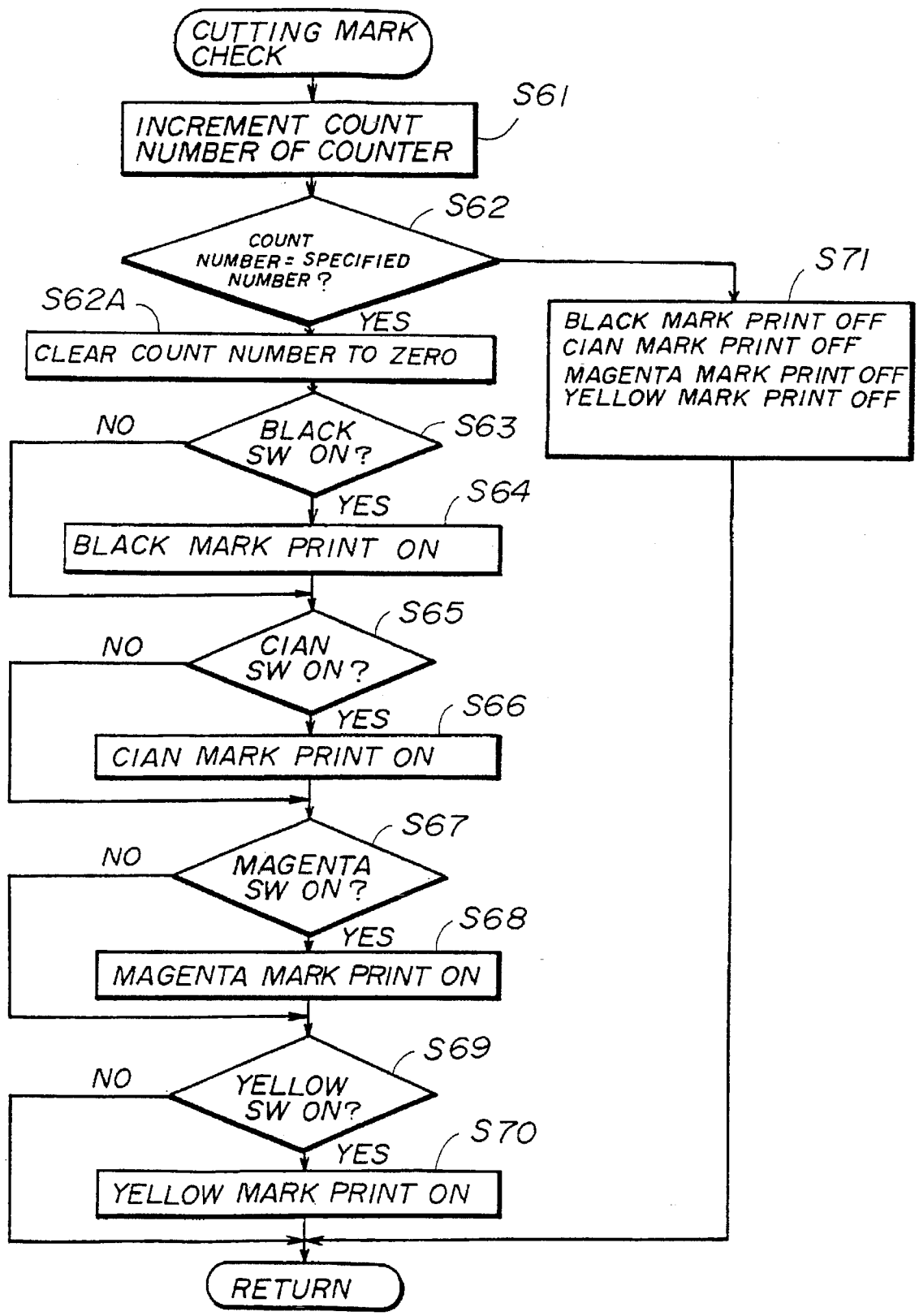
FIG. 8 shows another operation flowchart of appropriately preventing printing of cutting marks in the printer system in the second embodiment of the present invention.

FIG. 8 shows an operation flowchart of an operation which the printer system in the above-mentioned second embodiment of the present invention can perform, instead of the operation flowchart shown in FIG. 5, in an operation mode resulting from switching from an operation mode in which the printer system 1 operates in accordance with the operation flowchart shown in FIG. 5. In FIG. 8, if the count number of the sheet counter is in coincidence with the previously informed (specified) number of sheets of the multiple sheets of paper 14 (in S62 in FIG. 8), it can be determined that the currently used sheet is the last sheet of the multiple sheets of paper 14. Then the counter number of the sheet counter is cleared to 0 in S62A and cutting marks in an appropriate color are printed through S63, S64, S65, S66, S67, S68, S69 and S70.

If the count number of the sheet counter is not in coincidence with the previously informed (specified) number of sheets of the multiple sheets of paper 14 (in S62 in FIG. 8), it can be determined that the currently used sheet is not the last sheet of the multiple sheets of paper 14. Then, the printing of the cutting marks are prevented in S71 and thus no cutting marks are printed.

S61, S63, S64, S65, S66, S67, S68, S69, S70 and S71 are the same as S21, S23, S24, S25, S26, S27, S28, S29, S30 and S31 shown in FIG. 5, respectively.

Further, in each of the above-described methods, the cutting marks 18 are printed on the top sheets of the multiple sheets of printed paper 14 in a state in which a side of each sheet facing upward has an image printed thereon. However, if a number of sheets of the multiple sheets of paper 14 is a very large number, it may not be possible to cut the periphery thereof all at once through a certain cutter. In view of this matter, it is convenient if the printer system 1 prints the cutting marks on a currently used sheet every time a predetermined reference number of sheets have been used in a series of printing operations. This predetermined reference number is a number such that the certain cutter can cut off the periphery of the number of sheets of the multiple sheets of printed paper 14. Then, after completing the series of printing operations and thus obtaining the stack of the multiple sheets of printed paper 14, this stack is divided into division stacks, each stack containing the predetermined number of sheets or less than it. Then the certain cutter is used to cut each division stack of the division stacks of the multiple sheets of printed paper 14.

Figure 9:
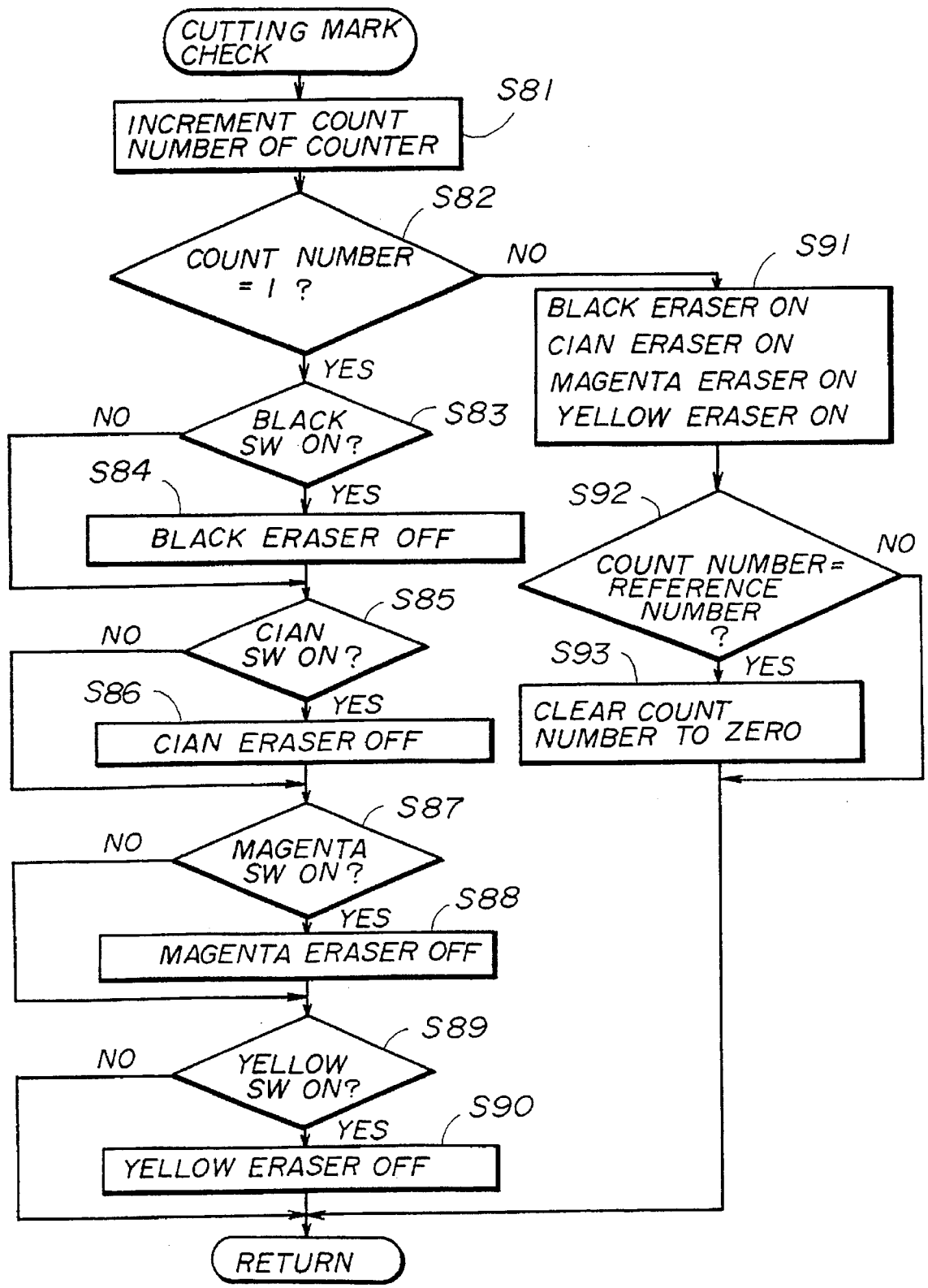
FIG. 9 shows another operation flowchart of appropriately preventing printing of cutting marks in the printer system in the first embodiment of the present invention.

For this purpose, the printer system 1 in the first embodiment of the present invention may also perform an operation in accordance with an operation flow chart shown in FIG. 9, instead of the operation flowchart shown in FIG. 4, in an operation mode resulting from switching from the operation mode in which the printer system 1 operates in accordance with the operation flowchart shown in FIG. 4.

In S82 shown in FIG. 9, it is determined, based on the count number of the sheet counter, whether or not a currently used sheet is the first sheet of every predetermined reference number of sheets among the multiple sheets of paper 14. If a result of S82 is YES, then, in the subsequent S83, S84, S85, S86, S87, S88, S89 and S90, the cutting marks 18 are printed on the sheet. S81, S82, S83, S84, S85, S86, S87, S88, S89, S90, S91 and S93 are the same as S1, S2, S3, S4, S5, S6, S7, S8, S9, S10, S11 and S13 shown in FIG. 4, respectively.

In S92, it is determined whether or not the currently used sheet is the last sheet of every predetermined reference number of sheets among the multiple sheets of paper 14. If a result of S92 is YES, S93 initializes the count number of the sheet counter to zero.

Figure 10:
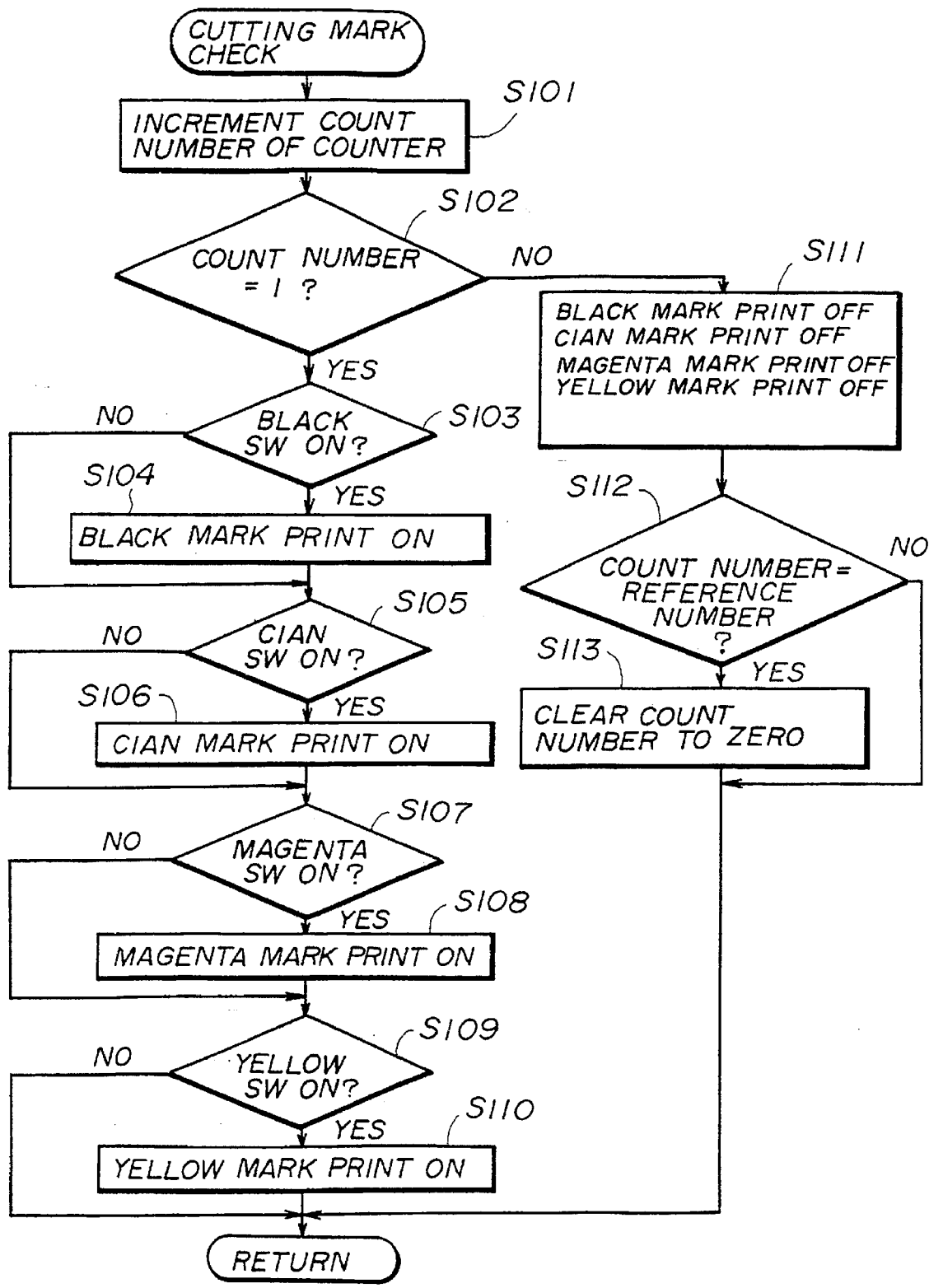
FIG. 10 shows another operation flowchart of appropriately preventing printing of cutting marks in the printer system in the second embodiment of the present invention.

FIG. 10 shows an operation flowchart of an operation which the printer system in the above-mentioned second embodiment of the present invention can perform, instead of the operation flowchart shown in FIG. 5, in an operation mode resulting from switching from the operation mode in which the printer system 1 operates in accordance with the operation flowchart shown in FIG. 5.

In S102 shown in FIG. 10, it is determined, based on the count number of the sheet counter, whether or not a currently used sheet is the first sheet of every predetermined reference number of sheets among the multiple sheets of paper 14. If a result of S102 is YES, then, in the subsequent S103, S104, S105, S106, S107, S108, S109, and S110, the cutting marks 18 are printed on the sheet. In S112, it is determined whether or not the currently used sheet is the last sheet of every predetermined reference number of sheets among the multiple sheets of paper 14.

If a result of S112 is YES, S113 initializes the count number of the sheet counter to zero. S101, S102, S103, S104, S105, S106, S107, S108, S109, S110, S111 and S113 are the same as S21, S22, S23, S24, S25, S26, S27, S28, S29, S30, S31 and S33 shown in FIG. 5, respectively.

By such methods, it is possible to smoothly proceed with works of cutting off the periphery of the large number of sheets of the multiple sheets of printed paper 14 in accordance with the thus-printed cutting marks. Therefore, it is possible to easily handle such a large number of sheets of the multiple sheets of printed paper 14.

Further, application of the present invention is not limited to the above-described printer systems communicating with the DTP system 5. It is also possible to similarly apply the present invention to a duplicator, a facsimile apparatus or the like. If the present invention is applied to a duplicator, it can be determined that a currently used sheet is the last sheet of the multiple sheets of paper 14 as a result of detecting the last page by the completion of the successive image scanning operations and successive printing paper transferring operations. If the present invention is applied to a facsimile apparatus, it can be determined that a currently used sheet is the last sheet of the multiple sheets of paper 14 based on data included in receiving data indicating a number of pages of sending images.

Further, the present invention is not limited to the above-described embodiments, and variations and modifications may be made without departing from the scope of the present invention.

What is claimed is:

1. A printing apparatus comprising;
   printing means for printing ordinary images on multiple sheets of paper, said printing means further determining if a predetermined sheet of said multiple sheets of paper is present and printing at least one cutting mark on the predetermined sheet of said multiple sheets of paper,
   said at least one cutting mark being printed at a periphery of a relevant one of said ordinary images printed on said predetermined sheet of said multiple sheets of paper,
   said at least one cutting mark being used as a reference for cutting off peripheries of said multiple sheets of paper.

2. The printing apparatus according to claim 1, further comprising:
   top sheet detecting means for detecting a top sheet of said multiple sheets of paper; and
   ejecting means for ejecting said multiple sheets of paper after said printing means prints said ordinary images and said at least one cutting mark on said multiple sheets of paper,
   said ejecting means thus creating a stack of said multiple sheets of paper,
   said top sheet being located at the top of said stack of said multiple sheets of paper when said stack of said multiple sheets of paper is in a state in which a relevant one of said ordinary images printed on said top sheet faces upward.

3. The printing apparatus according to claim 2, wherein:
   said printing means prints said ordinary images one by one:
   said top sheet detecting means detects a first sheet of said multiple sheets of paper which is used first in a series of printing operations performed by said printing means; and
   said ejecting means ejects said multiple sheets of paper one by one in a state in which each sheet of said multiple sheets of paper is upside down.

4. The printing apparatus according to claim 2, wherein:
   said printing means prints said ordinary images one by one:
   said top sheet detecting means detects a last sheet of said multiple sheets of paper which is used last in a series of printing operations performed by said printing means; and
   said ejecting means ejects said multiple sheets of paper one by one in a state in which each sheet of said multiple sheets of paper faces upward.

5. The printing apparatus according to claim 1, further comprising:
   a top sheet detecting means for detecting a top sheet of every predetermined reference number of sheets in said multiple sheets of paper; and
   ejecting means for ejecting said multiple sheets of paper after said printing means prints said ordinary images and at least one cutting mark on said multiple sheets of paper,
   said ejecting means thus creating a stack of said multiple sheets of paper,
   said top sheet being located at the top of a stack of every predetermined reference number of sheets in said stack of said multiple sheets of paper when said stack of said multiple sheets of paper is in a state in which a relevant one of said ordinary images printed on said top sheet faces upward.

6. The printing apparatus according to claim 1, wherein:
   said printing means comprises a plurality of single-color printing means; and
   at least one of said plurality of single-color printing means is selected for printing said at least one cutting mark.

7. A printing apparatus comprising:
   printing means for printing ordinary images and cutting marks on multiple sheets of paper; and
   preventing means for determining if a predetermined sheet of said multiple sheets of paper is present and preventing said printing means from printing said cutting marks on all of said multiple sheets of paper except for said predetermined sheet of said multiple sheets of paper,
   said cutting marks being printed at peripheries of said ordinary images printed on said multiple sheets of paper,
   said cutting marks being used as references for cutting off peripheries of said multiple sheets of paper.

8. A printing apparatus comprising:
   first receiving means for receiving a first image signal carrying image information of ordinary images;
   second receiving means for receiving a second image signal carrying image information of at least one cutting mark,
   said at least one cutting mark being printed at a periphery of a relevant one of said ordinary images printed on a predetermined sheet of multiple sheets of paper, said at least one cutting mark being used as a reference for cutting out peripheries of said multiple sheets of paper;

first printing means for printing said ordinary images on said multiple sheets of paper using said first signal;

second printing means for printing said at least one cutting mark on said predetermined sheet of said multiple sheets of paper using said second image signal; and preventing means for determining if said predetermined sheet of said multiple sheets of paper is present and preventing at least one of said second receiving means and said second printing means from performing a relevant operation when all sheets, except for said predetermined sheet, of said multiple sheets of paper are used in a series of printing operations.

* * * * *